United States Patent
Wind et al.

(10) Patent No.: US 10,989,349 B2
(45) Date of Patent: Apr. 27, 2021

(54) LENGTH-ADJUSTABLE DEVICE FOR CURING A TUBULAR LINER

(71) Applicant: SML Verwaltungs GmbH, Rohrbach (DE)

(72) Inventors: Herbert Wind, Albersweiler (DE); Christian Noll, Limburgerhof (DE)

(73) Assignee: SML VERWALTUNGS GMBH, Rohrbach (DE)

( * ) Notice: Subject to any disclaimer, the term of this patent is extended or adjusted under 35 U.S.C. 154(b) by 42 days.

(21) Appl. No.: 16/087,044

(22) PCT Filed: Mar. 23, 2017

(86) PCT No.: PCT/DE2017/100234
§ 371 (c)(1),
(2) Date: Sep. 20, 2018

(87) PCT Pub. No.: WO2017/167328
PCT Pub. Date: Oct. 5, 2017

(65) Prior Publication Data
US 2019/0101238 A1    Apr. 4, 2019

(30) Foreign Application Priority Data
Mar. 29, 2016 (DE) .................. 10 2016 105 722

(51) Int. Cl.
*F16L 55/40* (2006.01)
*B29C 35/00* (2006.01)
(Continued)

(52) U.S. Cl.
CPC ............ *F16L 55/40* (2013.01); *B29C 35/002* (2013.01); *B29C 35/0805* (2013.01); *B29L 2023/006* (2013.01)

(58) Field of Classification Search
CPC ..... F16L 55/40; B29C 35/002; B29C 35/0805
See application file for complete search history.

(56) References Cited

U.S. PATENT DOCUMENTS

2010/0314561 A1* 12/2010 Reutemann ............. F16L 55/18
                                                        250/522.1
2019/0016021 A1*  1/2019 Noll ....................... F16L 55/40

FOREIGN PATENT DOCUMENTS

DE    202015003257 U1    8/2015
DE    202015008926 U1    3/2016
(Continued)

OTHER PUBLICATIONS

The International Bureau of WIPO, International Preliminary Report on Patentability in International Application No. PCT/DE2017/1002334 (dated Oct. 2, 2018).

(Continued)

*Primary Examiner* — Joseph S Del Sole
*Assistant Examiner* — Yung-Sheng M Tsui
(74) *Attorney, Agent, or Firm* — Neal, Gerber & Eisenberg LLP; Thomas E. Williams; Daniel L. Organ

(57) ABSTRACT

The present invention relates to a device for curing resin-impregnated lining tubes using high-energy radiation, comprising at least two radiation sources for generating high-energy radiation, wherein the device has a front end, a rear end, two oppositely situated side ends, a top end, and a bottom end, wherein a length of the device from the front end to the rear end is smaller in a transport state than in an operating state. At least one element of the device is foldably, displaceably, rotatably, and/or movably supported, and at least one first radiation source is situated farther from at least one additional radiation source in the operating state than in the transport state. The device includes a fastening point on which a tensile force can act, in particular in the longitudinal direction of the device in order to transfer the device from the transport state into the operating state.

20 Claims, 3 Drawing Sheets

Figure 1:
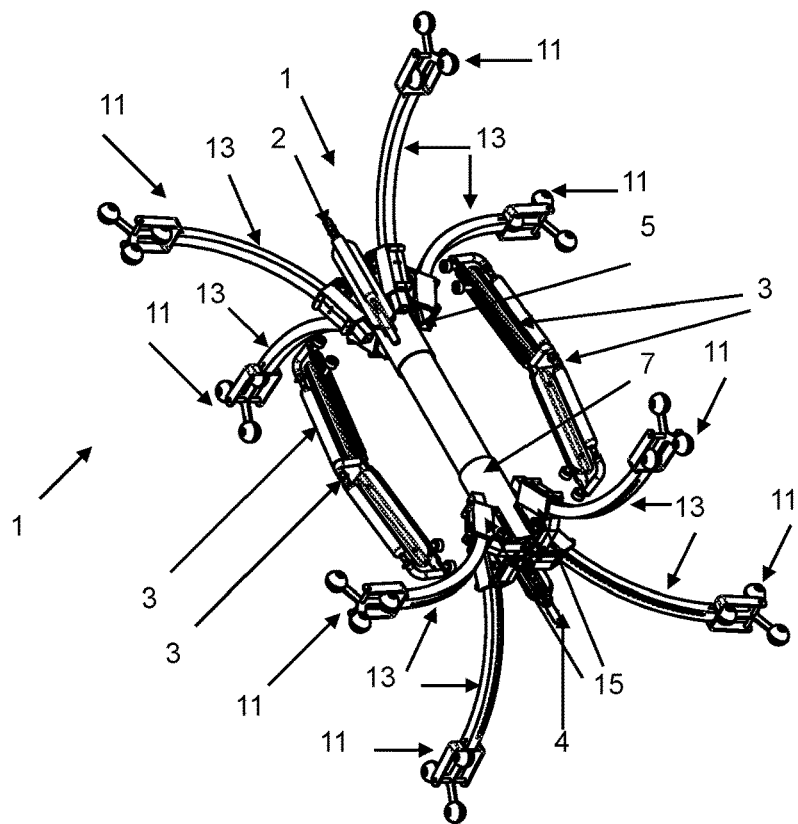

(51) Int. Cl.
*B29C 35/08* (2006.01)
*B29L 23/00* (2006.01)

(56) References Cited

FOREIGN PATENT DOCUMENTS

| EP | 0023623 | 2/1981 |
|---|---|---|
| EP | 1262708 | 12/2002 |
| WO | WO 1992/16784 A1 | 10/1992 |
| WO | 1995/004646 | 2/1995 |
| WO | 2000/073692 | 12/2000 |
| WO | 2003/038331 | 5/2003 |
| WO | 2011/006618 | 1/2011 |
| WO | WO 2017/167328 A1 | 10/2017 |

OTHER PUBLICATIONS

European Patent Office, International Search Report in International Application No. PCT/DE2017/100234 (dated Jun. 27, 2017).
European Patent Office, Written Opinion of The International Searching Authority in International Application No. PCT/DE2017/100234 (dated Jun. 27, 2017).

* cited by examiner

LENGTH-ADJUSTABLE DEVICE FOR CURING A TUBULAR LINER

The present invention relates to a device for curing a lining tube.

Methods for renovating pipe systems in which liquid or gaseous media, for example, are transported are known and frequently described in the prior art.

For example, methods are known in which the sections of the pipe system with a defect or damage are replaced with new sections. However, this is complicated and not always possible.

In addition, methods are known in the prior art in which for renovating pipe systems, for example ducts and similar piping systems, a flexible, curable layer that is impregnated with a curable resin, used as a lining tube (also referred to as a liner), is inserted into the pipe system. After the insertion, the lining tube is expanded so that it lies tightly against the inner wall of the pipe system. The resin is subsequently cured.

The manufacture of this type of lining tube is described in WO 95/04646, for example. Such a lining tube typically has an outer protective film that is impermeable to light, an inner film that is permeable at least to certain wavelength ranges of electromagnetic radiation, and a curable layer that is impregnated with a resin and situated between the inner film and the outer film.

The outer film tube is intended to prevent the resin, used for the impregnation, from escaping from the curable layer and into the environment. This requires good seal-tightness and bonding of the outer film tube to the resin-impregnated, curable layer.

A lining tube is known from WO 00/73692 A1, comprising an inner film tube, a resin-impregnated fiber band as a curable layer, and an outer tube that is laminated on its inner side with a fiber nonwoven.

For manufacturing the resin-impregnated fiber band, it is often helically wound in an overlapping manner onto the inner tube of a lining tube. The outer tube is subsequently likewise helically wound in an overlapping manner around the resin-impregnated fiber band. In the prior art, unsaturated polyester resins or vinyl ester resins, which can be dissolved in styrene and/or an acrylic ester, for example, are used as curable resins. These unsaturated polyesters or vinyl esters may be cured thermally (generally using peroxide catalysts) or by radiation, for example via UV light with photoinitiators, as described in EP-A 23623, for example. In addition, so-called combination curing, with a peroxide initiator that is used for the thermal curing in combination with photoinitiators, is possible, and has proven advantageous in particular for large wall thicknesses of the lining tubes. A method for such so-called combination curing is described in EP-A 1262708, for example. Unsaturated polyester or vinyl ester resins are subject to shrinkage during the curing, which may impair the stability of the renovated pipe system during subsequent operation.

For simplified manufacture, the inner tube itself is also wound around a winding mandrel. Alternatively, WO 95/04646, for example, discloses that a prefabricated inner film tube may be inflated, and used itself as the winding mandrel. Such a prefabricated inner film tube is made from a film band whose edges are joined together by welding or gluing in order to form the inner film tube.

Prior to the curing, the lining tubes are inserted into the pipe system to be renovated, and inflated by means of a fluid, generally compressed air. For inflating the lining tube, according to the prior art an opening end of the lining tube is acted on by compressed air, and the opposite opening end of the lining tube is closed with a closure device, a so-called packer. This closure device includes a hollow cylinder and a cover element with which the hollow cylinder may be closed.

For curing the lining tube, a curing device is inserted therein, the curing device having a radiation source and being guided through the curing [sic; lining] tube in order to activate or carry out the curing of the curable layers of the lining tube by means of the radiation energy.

The curing devices known from the prior art have the disadvantage that the curing device must be inserted into the lining tube before it is closed and inflated. The lining tube in the uninflated state is stretched around the packer. From there, the lining tube descends obliquely downwardly until it rests with both of its walls on the base of the pipe to be renovated. However, it is not possible to position the curing device within this descending course of the lining tube in order to protect the curing device from damage, since the lining tube does not rest on the curing device, even in the uninflated state. Thus, the lining tube, which may have a high weight, at least partially rests on the curing device until the lining tube is inflated by the compressed air.

The curing device may be damaged by the lining tube resting on it, as stated. The necessary repairs to the curing device result in high costs and a considerable time delay, since the curing device must initially be removed, at least from the lining tube.

Widening the packer to provide protection from the lining tube resting on the curing device is subject to technical limitations, and this procedure alone is not sufficient. On the one hand, the packer must be introduced through the relatively narrow manhole in the pipe to be renovated, so that greater widths result in a hindrance. On the other hand, packers, in particular for pipes having a fairly large diameter, already have a very high weight, which is increased even further by widening the packer.

In addition, due to technical constraints the length of the curing devices is not arbitrarily reducible. The radiation sources have a predefined length and width or a predefined diameter. Thus, the radiation sources themselves dictate a minimum length of the curing devices. For curing the lining tubes, it is also necessary for at least two radiation sources or arrangements of radiation sources to be passed through in succession, offset relative to one another, into the lining tube that is introduced into the pipe to be renovated. It is also problematic that, due to the high temperatures during the curing operation, drive units that are integrated into the curing device, such as motors, often do not operate very reliably and do not have a long service life.

The object of the present invention, therefore, is to overcome the disadvantages of the prior art, and in particular to provide a device that is not damaged by a lining tube that is not yet inflated.

This object is achieved in particular by a device for curing resin-impregnated lining tubes using high-energy radiation, comprising at least two radiation sources for generating high-energy radiation, wherein the device has a front end, a rear end opposite the front end, two oppositely situated side ends, a top end, and a bottom end opposite the top end, wherein a length of the device, measured from the front end to the rear end, is smaller in a transport state than in an operating state, in that at least one element of the device is foldably, displaceably, rotatably, and/or movably supported, and wherein at least one first radiation source is situated farther from at least one additional radiation source, in the longitudinal direction of the device, in the operating state than in the transport state, and wherein the device includes a fastening point, at or near the front end and/or the rear end, on which a tensile force from a power source that is situated outside the device acts or can act, in particular at least in part, in the longitudinal direction of the device in order to transfer the device from the transport state into the operating state.

The lining tube, which in the uninflated state is stretched around the packer, descends obliquely downwardly until it rests with both of its walls on the base of the pipe to be renovated. As a result of the transport state of the device according to the invention having dimensions that are smaller compared to the dimensions in the operating state, the device is or may be positioned completely within this descending course, for example in which the device according to the invention is situated completely in the stated area of the lining tube, or situated partially on the packer and partially in the lining tube. The device is thus protected from damage, since the lining tube does not rest on the device from above. The required spacing of the radiation sources is thus ensured in the operating state, in that the radiation sources are positioned farther from one another than in the transport state. It is apparent to those skilled in the art that the terms length, width, and height are used solely for easier understanding of the present invention. A length of the device according to the invention may also be a width, a height may be a length, and so forth.

According to the invention, it may prove to be particularly advantageous that no internal drive units are included for changing the length of the device. Rather, such a change in length is brought about by externally applied tensile forces. This has the advantage in particular that it is not possible for drive units of the device to be damaged by the high temperatures that are present during the curing. In addition, dispensing with such internal drive units reduces the costs and lowers the weight of the device according to the invention.

As stated above, during a curing operation, a device according to the invention is generally moved through a pipe to be renovated by means of cables or traction cables. These same cables or traction cables may be used, for example, to change the length of the device according to the invention without great technical effort.

Within the meaning of the present invention, pipe systems are understood to mean pipe systems of any type for transporting liquid or gaseous media, which may be operated under negative pressure, standard pressure, or positive pressure. Examples of such are pipelines of any type, pipeline systems for transporting media in chemical plants and production facilities, pressure pipes such as pressurized water pipes and drinking water pipes, and in particular also wastewater systems, which are laid underground, i.e., are not visible. Use of the illumination means according to the invention for curing lining tubes is also particularly suited for renovation of such wastewater pipes in duct systems.

According to one embodiment of the device according to the invention, it may also be provided that a width of the device, measured from one side end to the opposite side end, and/or a height of the device, measured from the bottom end to the top end, is smaller in a transport state than in an operating state, in that at least one further element of the device is foldably, displaceably, rotatably, and/or movably supported, in particular the change in the width and/or the changes in the height of the device together with the change in the length of the device taking place by means of the tensile force acting on the device and/or by means of at least one drive unit.

In addition to a change in the length of the device, according to one embodiment it may be advantageous that also the width and/or height of a device according to the invention is greater in an operating state than in a transport state. This allows particularly compact transport, and simpler arrangement of the device in the lining tube.

In particular it may be preferred that the change in the width and/or in the length may be brought about by a tensile force acting on the fastening points. Such mechanical force deflection mechanisms are known to those skilled in the art, and may be provided, for example, in the form of cable hoists, deflection rollers, lever mechanisms, and the like.

It may also be preferred that a cable, in particular a cable that includes Kevlar fibers and/or at least one traction cable, and/or a traction cable, are/is situated at a first front fastening point and/or at a second rear fastening point, wherein the device is or may be acted on by a tensile force acting in the longitudinal direction by means of the traction cable(s).

Such a cable or traction cable has proven particularly advantageous for transferring the device according to the invention from the transport state into the operating state. The fastening points may be acted on by tensile forces in a simple manner by means of the stated cable or traction cable.

It may also be provided that a first cable and/or traction cable are/is situated at a first fastening point at or near a front end, and a first tensile force is or may be provided on the device in a first longitudinal direction, and a second cable and/or traction cable are/is situated at a second fastening point at or near a rear end, and a second tensile force is or may be provided on the device in a second longitudinal direction, wherein the first tensile force acts or may act in the opposite direction from the second tensile force.

It may particularly advantageously be provided that a cable or traction cable is situated at both the front and the rear fastening points, and at least one of the traction cables is in, or bringable into, operative connection with an external drive unit, for example a cable winch, and the other traction cable is either likewise in, or bringable into, operative connection, or is eliminated at a further element, so that the device according to the invention is not undesirably changed in its position when force acts from one side.

According to the invention, it may be provided that a gas discharge lamp, a short arc lamp, a stroboscopic lamp, a flash lamp, an arc lamp, in particular a xenon lamp, and/or a mercury-xenon lamp are/is used as a radiation source, wherein in particular the illumination means provides or may provide at least fifty percent (50%) of the radiation energy in a wavelength range of 351 to 800 nm, in particular in a range of 380 nm to 800 nm, in particular in a range of 380 nm to 700 nm, preferably in a range of 390 nm to 470 nm, or in a range of 400 nm to 800 nm.

As a curable and/or curing layer, the lining tubes generally have one or more fiber bands that are impregnated with a curable resin. In principle, all products known to those skilled in the art, in the form of woven fabrics, knitted fabrics, laid fabrics, mats, or nonwovens, which may contain fibers in the form of long continuous fibers or short fibers, are suitable as fiber bands. Such products are known per se to those skilled in the art, and are commercially available in a wide variety from various manufacturers. Such lining tubes may be optimally cured using radiation sources according to the invention.

Within the scope of the present invention, felts are also to be understood as fiber bands within the meaning of the invention. A felt is a textile fabric made from a randomized fiber material that is difficult to separate. In principle, felts are therefore nonwoven textiles. Felts made of chemical fibers and plant fibers are generally manufactured by dry needling (so-called needle felts) or by consolidation using water jets that exit under high pressure from a nozzle bar. The individual fibers in the felt are randomly interlaced. Felts have good temperature resistance and are generally moisture-repellent, which may be advantageous for use in liquid-conducting systems.

The length of the fibers is not subject to any special limitation; i.e., so-called long fibers as well as short fibers or fiber fragments may be used. The properties of the fiber bands in question may also be set and controlled over wide ranges over the length of the fibers used.

In addition, the type of fibers used is not subject to limitation. Named strictly by way of example here are glass fibers, carbon fibers, or synthetic fibers such as aramid fibers, or fibers made of thermoplastic plastics such as polyesters, polyamides, or polyolefins (polypropylene, for example), whose properties are known to those skilled in the art and which are commercially available in a wide variety. Glass fibers are generally preferred for economic reasons; however, if special heat resistance, for example, is important, aramid fibers or carbon fibers, for example, may be used, which with regard to strength at elevated temperatures may offer advantages over glass fibers.

The lining tubes may contain one or more fiber bands, which may also be the same or different. Further suitable combinations of multiple fiber bands are described in WO 2011/006618, to which full reference is made at this point. In addition, WO 2003/038331 describes fiber bands and continuous materials having a suitable construction.

According to the invention, it may be provided that at least one first fastening unit and at least one second fastening unit are included, wherein the at least one first fastening unit is connected or connectable to the at least one second fastening unit by means of at least one telescoping arm and/or by means of a length-adjustable, in particular scissor-shaped, connecting element, or the at least one first fastening unit is connected or connectable to a first end of at least one connection unit by means of at least one telescoping arm and/or by means of a length-adjustable, in particular scissor-shaped, connecting element, and the at least one second fastening unit is connected or connectable to a second end, opposite from the first end of the connection unit, by means of at least one further telescoping arm and/or by means of a further length-adjustable, in particular scissor-shaped, connecting element, so that the at least one first connection unit and the at least one second connection unit are displaceable, preferably linearly displaceable, relative to one another and in particular relative to the connection unit.

Due to a connection according to the invention of the at least two fastening units by means of at least one telescoping arm, it may be possible to vary the length of the device using simple means, in particular by linearly moving the fastening units relative to one another. The telescoping arm is extended in the operating state, and retracted in the transport state. The length of the telescoping cantilever arm allows the length adjustment of the device according to the invention to be set. The use of at least two telescoping arms is made possible by the connection unit according to the invention. The at least one connection unit and the at least one second connection unit may be independently or simultaneously extended and retracted.

In addition, the connection unit allows in particular a doubled stroke length, and thus a doubled increase in the length of the device according to the invention. This may be achieved, for example, by arranging the two telescoping arms in parallel and offset relative to one another in the connection unit.

According to the invention, it may also be provided that at least one first radiation source, in particular n radiation sources, where n=1, 2, 3, 4, 5, 6, 7, 8, 9, 10, or greater, is/are situated at the first fastening unit, and at least one further radiation source, in particular m further radiation sources, where m=1, 2, 3, 4, 5, 6, 7, 8, 9, 10, or greater, is/are situated at the second fastening unit.

The number of radiation sources may be adapted to the type and the design as well as the diameter of the radiation sources to allow optimal curing of the lining tubes.

Furthermore, it may be provided that the radiation sources are situated at a first distance from the first and/or second fastening device, in particular that n, m radiation sources are situated in a circle around the first and/or second fastening device, offset by a midpoint angle $\alpha$ of the first and/or second fastening unit of 15°, 20°, 30°, 45°, 60°, 90°, or 120° relative to one another, preferably in each case three radiation sources offset by a midpoint angle $\alpha$ of 120° at the at least one first and the at least one second fastening unit.

Complete curing of the lining tubes may be made possible by a circular arrangement according to the invention of the radiation sources around the at least one first and/or second fastening unit. An arrangement of three radiation sources, each offset by 120°, has proven to be particularly advantageous.

It may also be preferred that the radiation sources are connected or connectable to the at least one first and/or the at least one second fastening unit, at a fixed distance therefrom, by means of spacer elements, or that the radiation sources are foldably, displaceably, rotatably, and/or movably situated relative to the at least one first and/or the at least one second fastening unit by means of spacer elements, in particular by means of telescoping spacer elements.

It has been shown that the radiation sources are connected to the device according to the invention by means of spacer elements, for example rod-shaped spacer elements, at a distance that is optimal for the particular diameter of the lining tube. Alternatively, for variable use of the device according to the invention without setup times, it may be advantageous that the radiation sources are connected to the first and/or the second fastening unit via variable spacer elements. This may take place in particular by means of telescoping spacer elements that allow linear displacement of the radiation sources.

According to the invention, it is likewise preferred that at least one, in particular all, radiation sources of the at least one first fastening device and of the at least one second fastening device are offset relative to one another by a midpoint angle $\beta$, so that in the transport state they are or may be situated in particular in parallel and overlapping, at least in sections.

Such an offset arrangement of the radiation sources has the advantage in particular that the radiation sources of the at least one first and/or second fastening unit do not block one another or hinder the device according to the invention when they are brought together. Thus, the problem that the outer dimensions of the device according to the invention are determined by double the length of a radiation source is solved, in that the length of the device according to the invention at a minimum corresponds to the length of a selected radiation source.

It may also be provided that the at least one first fastening device and/or the at least one second fastening device include(s) at least one, in particular o, where o=1, 2, 3, 4, 5, 6, 7, 8, 9, 10, or greater, wheels, wherein at least one, in particular each, of the wheels is connected or connectable to and spaced apart from the at least one first and/or the at least one second fastening device by means of at least one carrier element, wherein in particular the distance of at least one wheel, in particular all wheels, from the first and/or second fastening unit is smaller in the transport state than in the operating state.

Movement on rollers has proven advantageous for a movement of the device according to the invention in a lining tube. The rollers hereby rest on the inner wall of the lining tube. It is advantageous in particular when four wheels are included, in particular on both the first and the second fastening unit. According to one embodiment, wheels having three rollers that are supported so as to be rotatable about a central axis may prove to be particularly suitable. Using the stated three rollers makes it possible for even a height offset within the lining tube to be easily overcome. Such a height offset may result from a sleeve misalignment or a fold.

According to one embodiment of the invention, it may be advantageous that the carrier elements have a circular segment-shaped design, and in each case may be introduced into and passed through a bearing unit that is situated at the at least one first and/or second fastening unit and/or formed by same, wherein the carrier elements are offset by a midpoint angle γ of the first and/or second fastening unit of 15°, 20°, 30°, 45°, 60°, 90°, or 120° relative to one another, preferably in each case four carrier elements that are offset by a midpoint angle γ of 90° at the at least one first and/or the at least one second fastening unit.

Such a circular segment-shaped design of the carrier elements may make it possible for the device according to the invention to be compact in the transport state. In addition, the design according to the invention of the carrier elements allows the wheels of the at least one first and/or second fastening unit to be simultaneously spaced apart in two directions. Thus, the wheels rest against the inner wall of the lining tube, but in a manner of speaking move away from the radiation sources upon extension, so that the wheels are as far as possible from the radiation sources, and the curing of the lining tube by the emitted radiation of the radiation sources is not hindered. Shading of the lining tube by the wheels is thus prevented, and optimal curing is made possible. It has proven to be advantageous when the carrier elements are arranged in a circle, and thus ensure a secure hold in every direction at a predefined spacing of the device according to the invention in the lining tube to be cured.

Lastly, the invention provides for use of a device according to the invention in a lining tube and/or as a curing device for lining tubes, in particular for curing the lining tube, preferably for curing the curable layer of the lining tube.

Further features and advantages of the invention result from the following description, in which exemplary embodiments of the invention are explained by way of example with reference to schematic drawings, without thereby limiting the invention.

Figure 2:
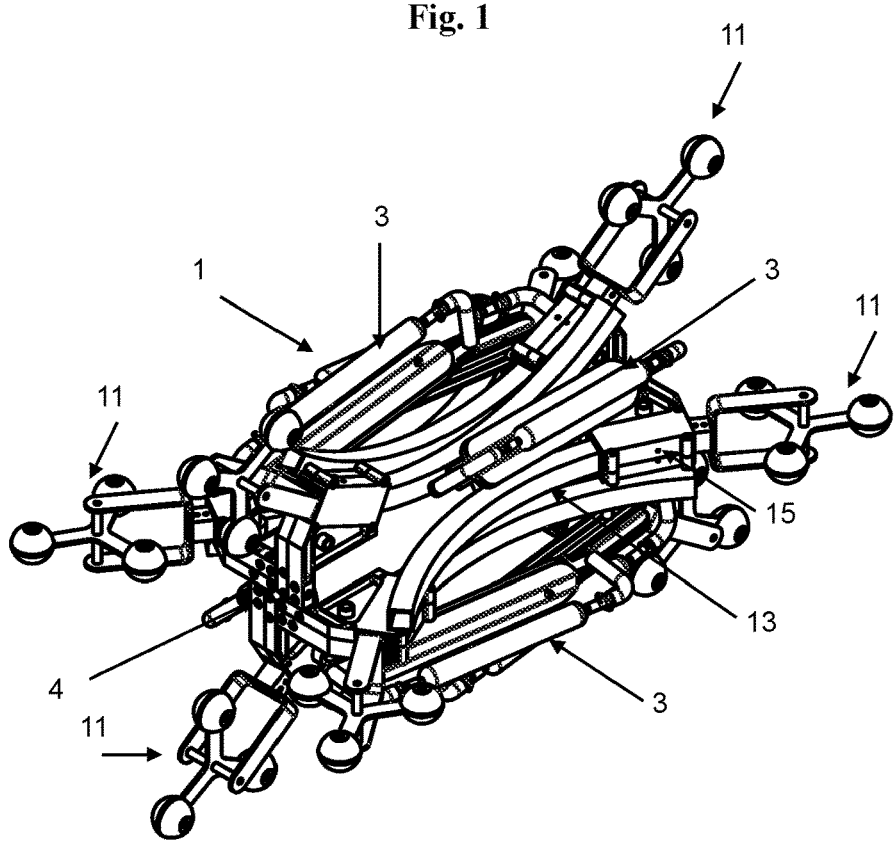
Figure 3:
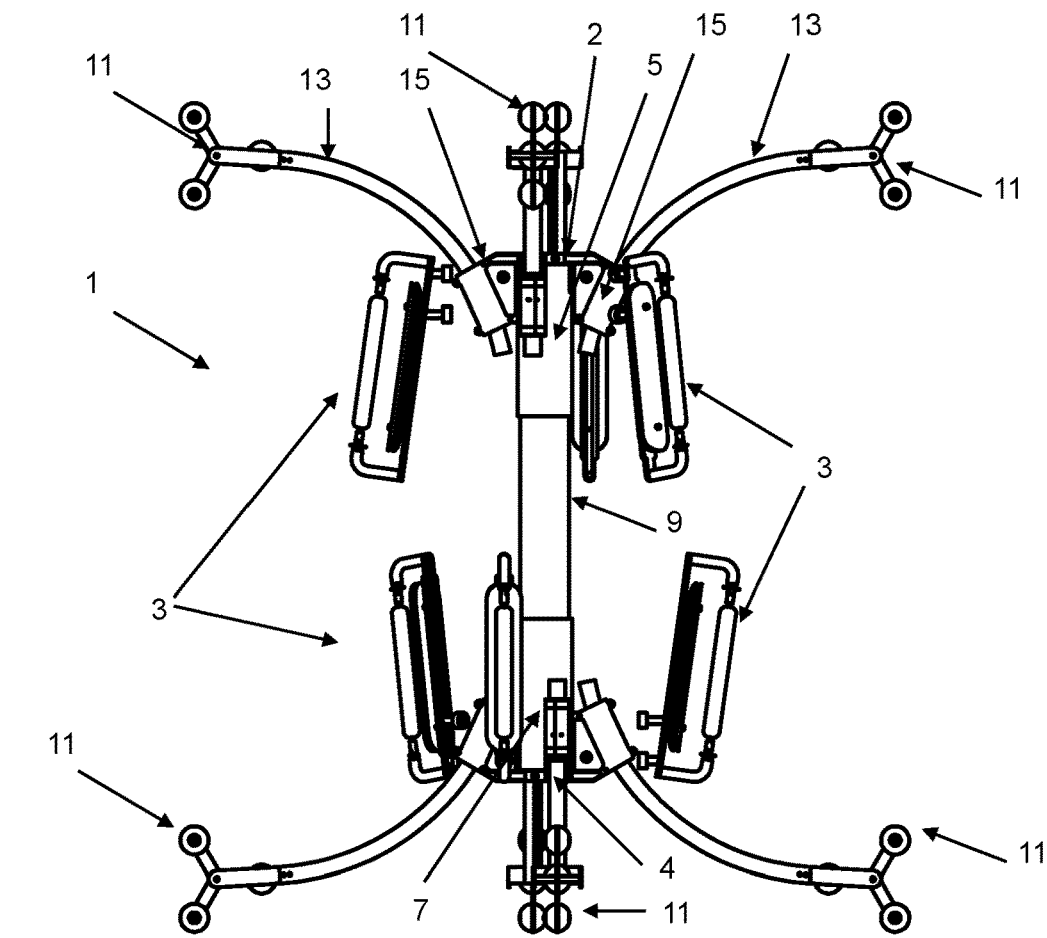
Figure 4:
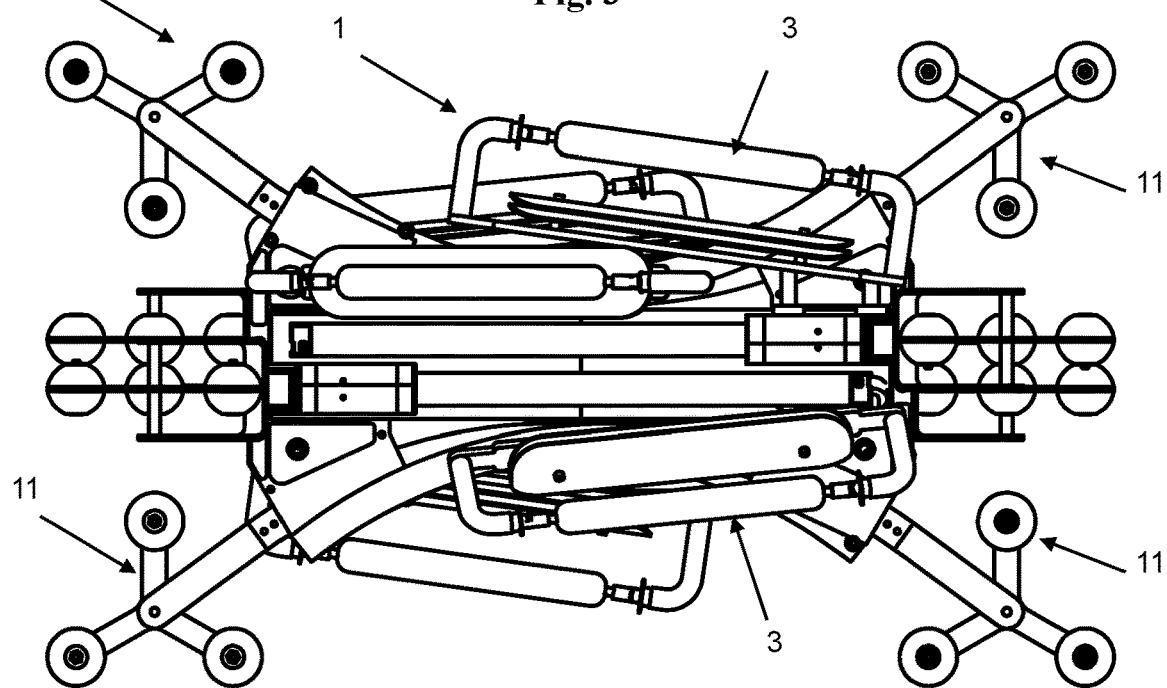
Figure 5:
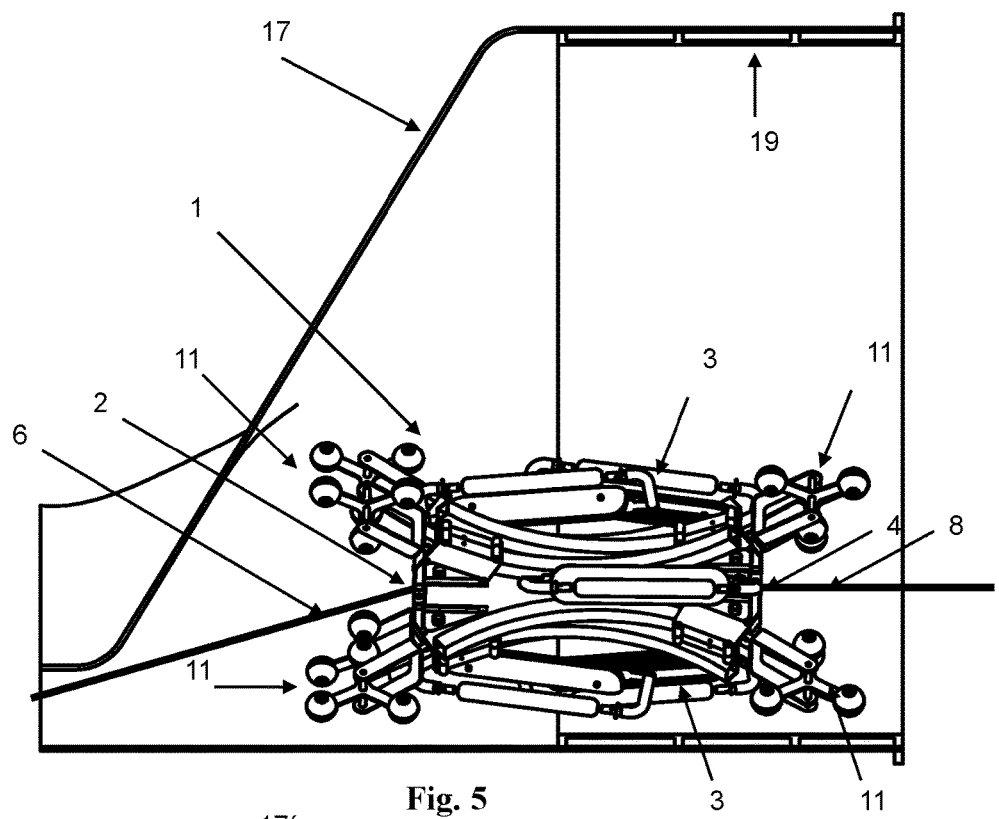
Figure 6:
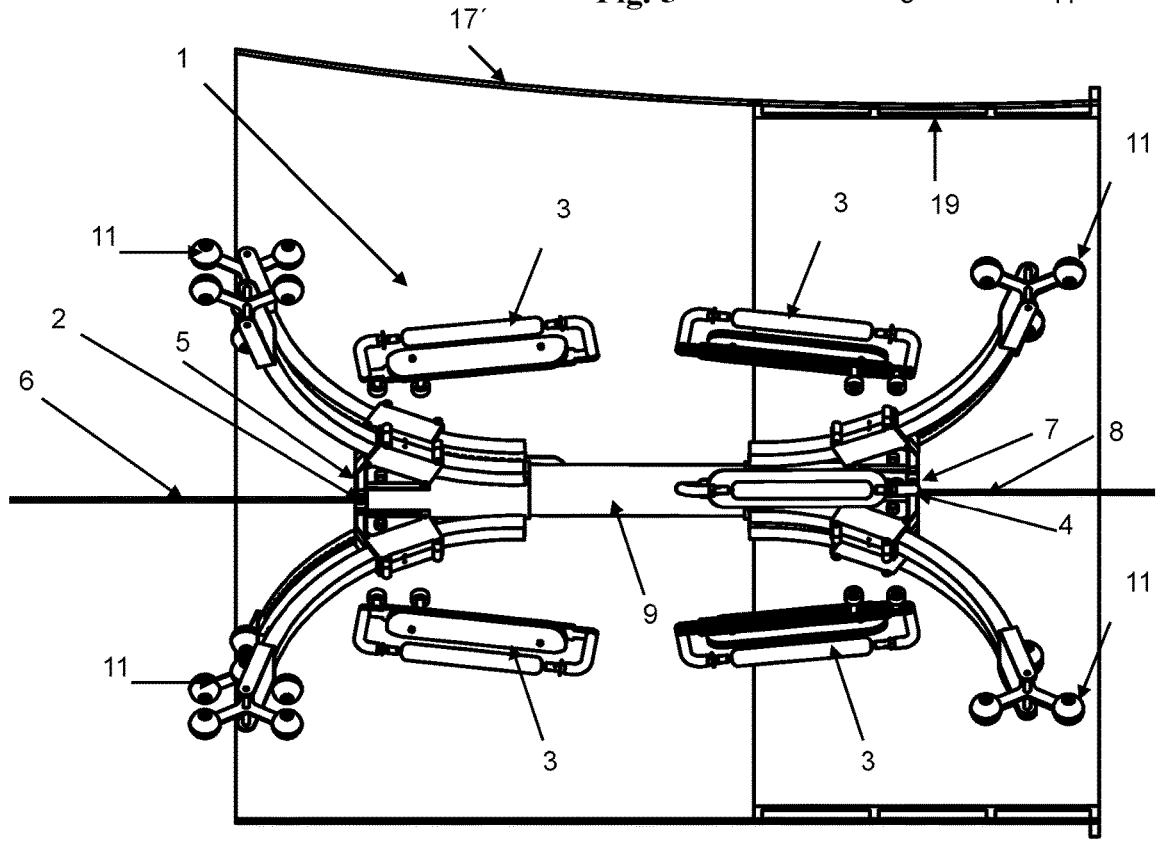

In the figures:

FIG. 1: shows a schematic perspective view of a device according to the invention in the operating state;

FIG. 2: shows a schematic perspective view of the device according to the invention from FIG. 1 in the transport state;

FIG. 3: shows a schematic side view of the device according to the invention from FIG. 1 in the operating state;

FIG. 4: shows a schematic side view of the device according to the invention from FIG. 1 in the transport state;

FIG. 5: shows a schematic side view of the device according to the invention from FIG. 1 in the transport state, in an uninflated lining tube; and FIG. 6: shows a schematic side view of the device according to the invention from FIG. 1 in the operating state, in an inflated lining tube.

Identical features are provided with the same reference numerals below. The figures show a device 1 according to the invention. The device 1 includes six radiation sources 3, which are connected to a first fastening unit 5 and a second fastening unit 7 by means of spacer elements, not shown. The first fastening unit 5 is connected to a connection unit 9 by means of a telescoping arm, and the second fastening unit 7 is connected to the connection unit 9 by means of a further telescoping arm on the opposite side of the connection unit 9. The telescoping arms allow linear displacement of the fastening units 5, 7 with respect to the connection unit 9 and with respect to one another. It is thus possible for the two fastening units 5, 7 to move away from one another.

Fastening points 2, 4 are provided by means of which tensile forces may act on the device 1 according to the invention. In particular, FIGS. 5 and 6 show cables 6, 8 that may preferably be used for force transmission of tensile forces of drive units, not shown, in order to transfer the device 1 from the transport state into the operating state.

As is apparent in particular in FIGS. 1, 3, and 6, the three radiation sources 3 are offset relative to one another in a circle around the first and the second fastening devices 5, 7 by a midpoint angle α of the first and the second fastening units of 120°. The spacing of the radiation sources 3 is fixedly or variably set by the spacer elements, not shown.

It may be advantageous that the radiation sources 3, as shown, are situated relative to one another about a midpoint angle β, so that in the transport state they are or may be situated in particular in parallel and overlapping, at least in sections. This is illustrated particularly clearly in FIG. 4.

The device 1 according to the invention includes four wheels 11 in each case on the first and the second fastening units 5, 7. Each of the wheels 11 includes three rollers that are supported so as to be rotatable about a central axis. Using the stated three rollers makes it possible for even a height offset within the lining tube to be easily overcome. Such a height offset may result from a sleeve misalignment or a fold. It is apparent that carrier elements 13 of the wheels 11 have a circular segment-shaped design, and in each case may be introduced into and passed through a bearing unit 15 that is situated in each case at the first and second fastening units 5, 7. Thus, during a transition of the device 1 from the transport state into the operating state, the wheels may be simultaneously spaced apart from the fastening units 5, 7 in two directions, so that the wheels 11 do not hinder the curing of the lining tube due to shading.

The four carrier elements 13 are in each case offset by a midpoint angle γ of the first or second fastening unit 5, 7 of 90° relative to one another. It may thus be ensured that the positioning of the device 1 according to the invention within a pipe to be renovated is optimal at all times, and guiding of the device in the lining tube takes place from four directions.

In particular, FIGS. 5 and 6 illustrate a device according to the invention in a lining tube to be cured. The lining tube 17 is stretched over a packer 19, and is illustrated in the uninflated state in FIG. 5 and in the inflated state in FIG. 6. As shown in FIG. 5, the uninflated lining tube 17 descends obliquely downwardly until it rests with both of its walls on the base. The device 1 according to the invention is in the transport state. The first and second fastening devices 5, 7 are connected to one another, with a retracted telescoping arm, via the connection unit 9. The radiation sources 3 are present overlapping in areas, since they are offset relative to one another about the midpoint angle β. In addition, the circular segment-shaped carrier elements 13 are passed through the bearing unit 15, and thus minimize the size of the device according to the invention.

As soon as the lining tube 17' is inflated, as shown in FIG. 6, the first and second fastening units 5, 7 are spaced apart from the connection unit 9 due to an extension of the telescoping arms, and the circular segment-shaped carrier elements extend, so that the device 1 according to the invention is in the operating state without possibly being damaged by the lining tube 17, 17'. The corresponding forces required for transferring the device 1 from the transport state into the operating are provided by means of the cables 6, 8, which are connected to the device 1 at the fastening points 2, 4.

The features of the invention disclosed in the preceding description and in the claims may be important, alone or also in any given combination, for implementing the invention in its various embodiments.

The invention claimed is:

1. A device for curing a resin-impregnated lining tube using radiation energy, comprising:
    at least two radiation sources configured to generate radiation energy from 351 nm to 800 nm,
    wherein the device has a front end, a rear end opposite the front end, two oppositely situated side ends, a top end, and a bottom end opposite the top end,
    wherein:
        (a) a length of the device, measured from the front end to the rear end, is smaller in a transport state than in an operating state,
        (b) a width of the device, measured from one side end to the opposite side end, and/or a height of the device, measured from the bottom end to the top end is smaller in the transport state than in the operating state, and
        (c) at least one element of the device is foldably, displaceably, rotatably, and/or movably supported,
    wherein at least one first radiation source is situated farther from at least one additional radiation source, in a longitudinal direction of the device, in the operating state than in the transport state, and
    wherein the device includes a fastening point at or near the front end and/or the rear end, and a cable is situated at the front and/or rear fastening point and configured to provide a tensile force acting in the longitudinal direction of the device and change the width and/or height of the device together with the change in length of the device.

2. The device according to claim 1, wherein the cable comprises Kevlar fiber.

3. The device according to claim 1, wherein the at least two radiation sources are offset from one another.

4. The device according to claim 1, wherein the at least two radiation sources comprise at least one of a gas discharge lamp, a short arc lamp, a stroboscopic lamp, a flash lamp, an arc lamp, a xenon lamp, and a mercury-xenon lamp.

5. The device according to claim 1, wherein the at least two radiation sources are configured to generate at least 50% of the radiation energy from 351 nm to 800 nm.

6. The device according to claim 5, wherein the at least two radiation sources are configured to generate at least 50% of the radiation energy from 380 nm to 800 nm.

7. The device according to claim 6, wherein the at least two radiation sources are configured to generate at least 50% of the radiation energy from 380 nm to 700 nm.

8. The device according to claim 7, wherein the at least two radiation sources are configured to generate at least 50% of the radiation energy from 390 nm to 470 nm.

9. The device according to claim 5, wherein the at least two radiation sources are configured to generate at least 50% of the radiation energy from 400 nm to 800 nm.

10. The device according to claim 1, including a connection unit disposed between the front end and the rear end of the device, the connection unit including a front telescoping arm positioned at or near a front end of the connection unit and a rear telescoping arm positioned at or near a rear end of the connection unit.

11. The device according to claim 10, wherein the front telescoping arm includes a front fastening unit comprising the front fastening point for a first cable and wherein the rear telescoping arm includes a rear fastening unit comprising the rear fastening point for a second cable, wherein the front and rear telescoping arms are configured to longitudinally extend away from one another when under tensile load by the first and second cables.

12. The device according to claim 11, wherein the at least one first radiation source is connected to the front fastening unit and wherein the at least one additional radiation source is connected to the rear fastening unit.

13. The device according to claim 11, wherein each of the front and rear fastening units include at least one carrier unit.

14. The device according to claim 13, wherein the at least one carrier unit includes at least one wheel, and wherein the at least one wheel includes at least one roller for resting on an inner wall of a lining tube when the device is in the operating state.

15. A device for curing a resin-impregnated lining tube using radiation energy, comprising:
    at least two radiation sources configured to generate radiation energy from 351 nm to 800 nm,
    wherein the device has a front end, a rear end opposite the front end, two oppositely situated side ends, a top end, and a bottom end opposite the top end,
    wherein:
        (a) a length of the device, measured from the front end to the rear end, is smaller in a transport state than in an operating state, and
        (b) a width of the device, measured from one side end to the opposite side end, and/or a height of the device, measured from the bottom end to the top end is smaller in the transport state than in the operating state, and
        (c) at least one element of the device is foldably, displaceably, rotatably, and/or movably supported, and
    wherein the device includes a fastening point at or near the front end and/or the rear end, and a cable is situated at the front and/or rear fastening point and configured to provide a tensile force acting in the longitudinal direction of the device and change the width and/or height of the device together with the change in length of the device.

16. The device according to claim 15, wherein the width of the device in the transport state is less that the width of the device in the operating state.

17. The device according to claim 15, wherein the at least two radiation sources are offset from one another.

18. The device according to claim 15, wherein the at least two radiation sources comprise at least one of a gas discharge lamp, a short arc lamp, a stroboscopic lamp, a flash lamp, an arc lamp, a xenon lamp, and a mercury-xenon lamp.

19. A device for curing a resin-impregnated lining tube using radiation energy, the device comprising a front end, a rear end opposite the front end, two oppositely situated side ends, a top end, and a bottom end opposite the top end, the device comprising:
  at least two radiation sources configured to generate radiation energy from 351 nm to 800 nm,
  wherein:
    (a) a length of the device, measured from the front end to the rear end, is smaller in a transport state than in an operating state, and
    (b) a width of the device, measured from one side end to the opposite side end, and/or a height of the device, measured from the bottom end to the top end is smaller in a transport state than in an operating state, and
    (c) at least one element of the device is foldably, displaceably, rotatably, and/or movably supported, and
  wherein the device includes a fastening point at or near the front end and/or the rear end, and a cable is situated at the front and/or rear fastening point and configured to provide a tensile force acting in the longitudinal direction of the device and change the width and/or height of the device together with the change in length of the device.

20. The device according to claim 19, wherein the width of the device in the transport state is less that the width of the device in the operating state.

* * * * *